US012784705B2

(12) United States Patent
Cui et al.

(10) Patent No.: US 12,784,705 B2
(45) Date of Patent: Nov. 3, 2026

(54) DRIVING METHOD OF DISPLAY PANEL, DRIVING CIRCUIT, AND DISPLAY PANEL

(71) Applicant: HKC CORPORATION LIMITED, Shenzhen (CN)

(72) Inventors: Jianyu Cui, Shenzhen (CN); Zeyao Li, Shenzhen (CN); Xianfei Zhu, Shenzhen (CN); Tian Lan, Shenzhen (CN); Lidan Ye, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 19/177,692

(22) Filed: Apr. 14, 2025

(65) Prior Publication Data

US 2025/0329308 A1 Oct. 23, 2025

(30) Foreign Application Priority Data

Apr. 17, 2024 (CN) ......................... 202410479233.8

(51) Int. Cl.
*G09G 3/36* (2006.01)
*G09G 3/34* (2006.01)

(52) U.S. Cl.
CPC ......... *G09G 3/3618* (2013.01); *G09G 3/3446* (2013.01); *G09G 2310/0245* (2013.01); *G09G 2320/0233* (2013.01)

(58) Field of Classification Search
CPC .................................................. G09G 2310/08
See application file for complete search history.

(56) References Cited

U.S. PATENT DOCUMENTS

| | | | | |
|---|---|---|---|---|
| 2003/0016202 A1* | 1/2003 | Edwards | G09G 3/2011 | 345/98 |
| 2003/0043134 A1* | 3/2003 | Cairns | G09G 3/3648 | 345/204 |
| 2010/0123841 A1* | 5/2010 | Shin | G02F 1/134363 | 349/139 |
| 2011/0298784 A1* | 12/2011 | Yamashita | G09G 3/3666 | 345/99 |
| 2012/0075251 A1* | 3/2012 | Yamauchi | G09G 3/3659 | 345/204 |
| 2013/0307835 A1* | 11/2013 | Wu | G09G 3/3611 | 345/212 |

FOREIGN PATENT DOCUMENTS

| | | |
|---|---|---|
| CN | 104699313 A | 6/2015 |
| CN | 108172157 A | 6/2018 |
| CN | 110164396 A | 8/2019 |
| CN | 114333733 A | 4/2022 |
| CN | 116991010 A | 11/2023 |

* cited by examiner

*Primary Examiner* — Nan-Ying Yang

(57) ABSTRACT

A driving method of a display panel, a driving circuit, and a display panel are disclosed. The driving method includes: monitoring whether the display panel meets a preset refresh condition; in response to monitoring that the preset refresh condition is met, driving all pixel electrodes in the display panel to be short-circuited by a refresh driving signal, and disconnecting all the pixel electrodes from each other after a first preset time. All the pixel electrodes in the display panel are driven to be short-circuited by the refresh driving signal, and then disconnected after the first preset time, so that all pixel electrodes are at the same potential. When the pixel electrodes are subsequently charged, the possible voltage error can be reduced.

12 Claims, 5 Drawing Sheets

DRIVING METHOD OF DISPLAY PANEL, DRIVING CIRCUIT, AND DISPLAY PANEL

CROSS-REFERENCE TO RELATED APPLICATIONS

This application claims the priority and benefit of Chinese patent application number 2024104792338, titled "Driving Method of Display Panel, Driving Circuit, and Display Panel" and filed Apr. 17, 2024 with China National Intellectual Property Administration, the entire contents of which are incorporated herein by reference.

TECHNICAL FIELD

This application relates to the field of display technology, and more particularly relates to a driving method of a display panel, a driving circuit, and a display panel.

BACKGROUND

The description provided in this section is intended for the mere purpose of providing background information related to the present application but does not necessarily constitute prior art.

Liquid crystal display panels or electronic paper display panels may generate an electric field between a pixel electrode and a common electrode to drive liquid crystals to rotate or charged particles to move so as to realize the display of images.

The pixel electrode in the display panel is frequently charged and discharged, which may cause the voltage in the pixel electrode to shift, resulting in a gap between the voltage required by the pixel electrode and the actual voltage, hence uneven display of the display panel.

SUMMARY

It is therefore one purpose of this application to provide a driving method of a display panel, a driving circuit, and a display panel to ensure that pixel electrodes are at the same potential and improve the display uniformity of the display panel.

This application discloses a driving method of a display panel, and the driving method of a display panel includes the following operations:

monitoring whether the display panel meets a preset refresh condition;

if the preset refresh condition is met, driving all pixel electrodes in the display panel to be short-circuited by a refresh driving signal, and disconnecting them after a first preset time.

In some embodiments, the operation that if the preset refresh condition is met, driving all pixel electrodes in the display panel to be short-circuited by a refresh driving signal, and disconnecting them after a first preset time includes:

if the preset refresh condition is met, driving all pixel electrodes in the display panel to be connected through a metal line by a refresh driving signal, and disconnecting the connection between all pixel electrodes in the display panel after the first preset time.

In some embodiments, the operation that if the preset refresh condition is met, driving all pixel electrodes in the display panel to be connected by a refresh driving signal, and disconnecting the connection between all pixel electrodes in the display panel after the first preset time includes:

if the preset refresh condition is met, driving all pixel electrodes in the display panel to be connected to a common electrode line by the refresh driving signal, and disconnecting the connection between all pixel electrodes in the display panel and the common electrode line after a first preset time.

In some embodiments, the operation that if the preset refresh condition is met, driving all pixel electrodes in the display panel to be connected by a refresh driving signal, and disconnecting the connection between all pixel electrodes in the display panel after a first preset time includes:

if the preset refresh condition is met, driving all pixel electrodes in the display panel to be connected with the corresponding data line or scan line by the refresh driving signal, and disconnecting the connection between all pixel electrodes in the display panel and the data line or scan line after the first preset time.

In some embodiments, the display panel is a liquid crystal display panel, and the preset refresh condition is that the current image is a static image, and the static image duration is 5 to 10 minutes;

and the method further includes the following operation subsequent to the operation that if the preset refresh condition is met, using the refresh driving signal to drive all pixel electrodes in the display panel to be short-circuited, and disconnecting after the first preset time:

recharging the pixel electrodes to keep the display of the current image.

In some embodiments, the display panel is an electronic paper display panel, and the preset refresh condition is image switching;

and the method further includes the following operation subsequent to the operation that if the preset refresh condition is met, driving all pixel electrodes in the display panel to be short-circuited by the refresh driving signal, and disconnecting after the first preset time:

charging the pixel electrodes with data driving signals of the next frame to maintain image switching.

In some embodiments, the operation of monitoring whether the display panel meets the preset refresh condition includes:

after the current frame ends and before the next frame begins, monitoring whether the display panel meets the preset refresh condition;

if the preset refresh condition is met, the operation of driving all pixel electrodes in the display panel to be connected to the common electrode line by the refresh driving signal, and disconnecting the connection between all pixel electrodes in the display panel and the common electrode line after the first preset time includes:

if the preset refresh condition is met, driving all pixel electrodes in the display panel to be connected to the common electrode line by the refresh driving signal after the current frame ends and before the next frame begins, and disconnecting the connection between all pixel electrodes in the display panel and the common electrode line after the first preset time.

This application further discloses a driving circuit. The driving circuit includes at least one processor and a non-transitory computer-readable storage medium storing program instructions executable by the at least one processor. The program instructions include a detection and determination module, a refresh driving signal generation module, and an equipotential control module. The detection and determination module is used to determine whether the display panel meets a preset refresh condition. The detection and determination module is connected to the refresh driving signal generation module to control the refresh driving signal generation module to generate a refresh driving signal. The equipotential control module is connected to each of the pixel electrode and the refresh driving signal generation module to receive the signal sent by the refresh driving signal generation module and control all pixel electrodes to be short-circuited.

This application further discloses a display panel. The display panel includes an array substrate. The array substrate includes a first base, and a data line, a scan line, a pixel electrode, a first active switch, and a second active switch that are arranged on the first base. The data lines and the scan lines are arranged in a crisscross pattern to divide the display panel into a plurality of pixel units. The first active switches, the second active switches, and the pixel electrodes are each arranged in one-to-one correspondence with the pixel units. A gate of the first active switch is connected to the respective scan line. A source of the first active switch is connected to the respective data line. A drain of the first active switch is connected to the respective pixel electrode.

The gate of the second active switch is used to receive a refresh driving signal. The source of the second active switch is connected to the respective pixel electrode. The drain of each and every second active switch is connected together.

In some embodiments, the display panel includes an array substrate and an opposing substrate arranged opposite to each other. The array substrate is arranged opposite to the opposing substrate. The opposing substrate includes a second base and a common electrode arranged on the second base. The common electrode is arranged opposite to the pixel electrode. The array substrate further includes a common electrode line. The common electrode line is arranged on the first base. The common electrode line is connected to the common electrode.

The drain of each and every second active switch is connected together through the common electrode line.

Compared with the related display panel, due to the frequent charging and discharging of the pixel electrode in the display panel, the voltage of the pixel electrode will be offset, so that the actual voltage of the pixel electrode changes, resulting in inaccurate voltage during charging. Therefore, in this application, all pixel electrodes in the display panel are driven to short-circuit by a refresh driving signal, and then disconnected after a first preset time, so that the pixel electrodes on the entire display panel can maintain the same potential, thus avoiding the voltage deviation of the pixel electrodes, and improving the display uniformity of the display panel.

BRIEF DESCRIPTION OF DRAWINGS

The accompanying drawings are used to provide a further understanding of the embodiments according to this application, and constitute a part of the specification. They are used to illustrate the embodiments according to this application, and explain the principles of this application in conjunction with the text description. Apparently, the drawings in the following description merely represent some embodiments of the present disclosure, and for those having ordinary skill in the art, other drawings may also be obtained based on these drawings without investing creative. In the drawings.

Figure 1:
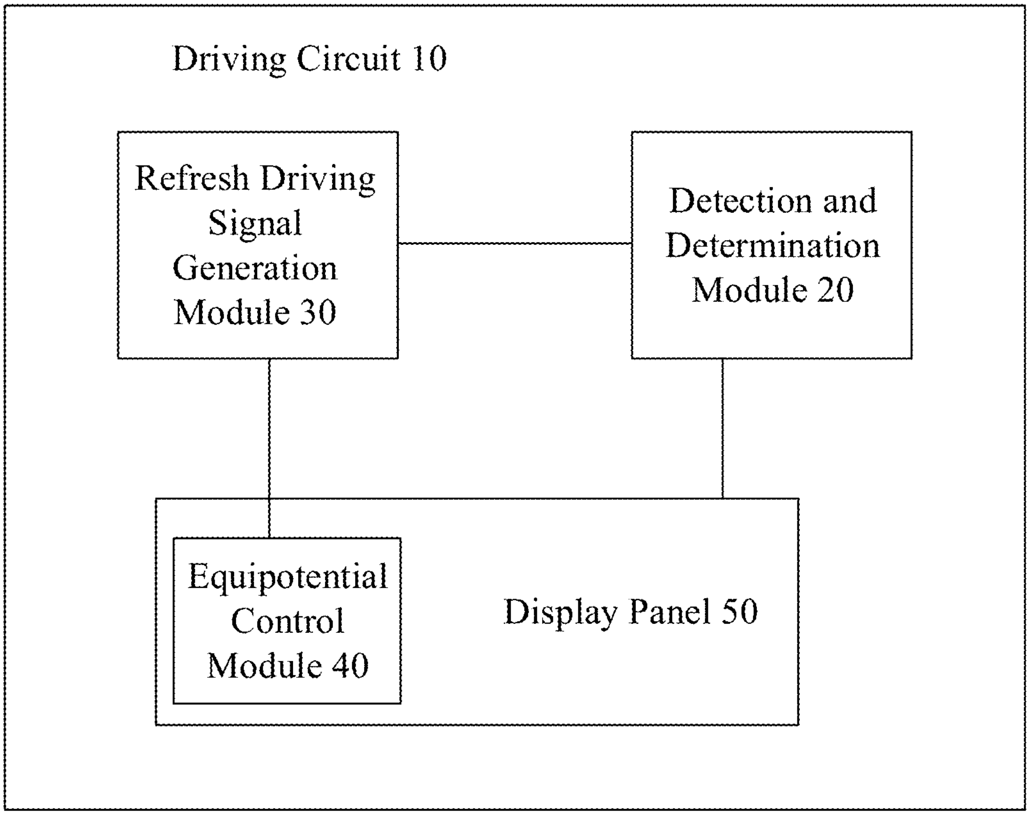
FIG. 1 is a schematic diagram of a driving circuit according to an embodiment of this application.

In the drawings: 10, driving circuit; 20, detection and determination module; 30, refresh driving signal generation module; 40, equipotential control module; 50, display panel; 100, array substrate; 110, first base; 120, data line; 130, scan line; 140, pixel electrode; 150, first active switch; 160, second active switch; 170, common electrode line; 180, metal line; 200, opposing substrate; 210, second base; 220, common electrode; H1, display time; H2, blanking time; 300, refresh driving signal; 400, gate driving signal; 500, third active switch.

DETAILED DESCRIPTION OF EMBODIMENTS

It should be understood that the terms used herein, the specific structures and functional details disclosed therein are merely representative for describing some specific embodiments, but this application can be implemented in many alternative forms and should not be construed as being limited to only these embodiments described herein.

As used herein, terms "first", "second", or the like are merely used for illustrative purposes, and shall not be construed as indicating relative importance or implicitly indicating the number of technical features specified. Thus, unless otherwise specified, the features defined by "first" and "second" may explicitly or implicitly include one or more of such features. Terms "multiple", "a plurality of", and the like mean two or more. Terms "comprise", "comprising", "includes", "including", and any variations thereof are intended to be non-exclusive, and one or more other features, integers, steps, operations, units, components, and/or combinations thereof may be present or be added.

In addition, terms "center" "lateral", "up", "down", "left", "right", "vertical", and "horizontal", "top", "bottom", "inside", or the like are used to indicate orientational or relative positional relationships based on those illustrated in the drawings. They are merely intended for simplifying the description of the present disclosure, rather than indicating or implying that the device or element referred to must have a particular orientation or be constructed and operate in a particular orientation. Therefore, these terms are not to be construed as restricting the present disclosure.

In addition, unless otherwise clearly specified and defined, the terms "installed on", "disposed on", "arranged on", and "connected to" should be understood in a broad sense. For example, it may be a fixed connection, a detachable connection, or an integral connection; it may be a mechanical connection or an electrical connection; it may be a direct connection or an indirect connection through an intermediate medium, or it may be internal communication between two elements. For those of ordinary skill in the art, the specific meanings of the above terms as used in this application can be understood depending on specific contexts.

This application will be described in detail below with reference to the accompanying drawings and some optional embodiments.

FIG. 1 is a schematic diagram of a driving circuit according to an embodiment of this application. As shown in FIG. 1, this application discloses a driving circuit 10. The driving circuit 10 includes at least one processor and a non-transitory computer-readable storage medium storing program instructions executable by the at least one processor. The program instructions include a detection and determination module 20, a refresh driving signal generation module 30, and an equipotential control module 40.

The detection and determination module 20 is used to determine whether the display panel 50 meets a preset refresh condition. The detection and determination module 20 is connected to the refresh driving signal generation module 30 to control the refresh driving signal generation module 30 to generate a refresh driving signal. The equipotential control module 40 is connected to the pixel electrode 140 and the refresh driving signal generation module 30, and is used to receive the signal sent by the refresh driving signal generation module 30 and control all pixel electrodes 140 to be short-circuited.

In this application, the detection and determination module 20 determines whether the display panel 50 meets the preset refresh condition, where the preset refresh condition includes image switching, still image, and still image duration, etc. When it is detected that the display panel 50 meets the preset refresh condition, the refresh driving signal generation module 30 may be controlled to generate a refresh driving signal. After receiving the refresh driving signal, the equipotential control module 40 controls all pixel electrodes 140 to be at the same potential, thereby ensuring the potential uniformity of the pixel electrode 140, and then ensuring the subsequent uniformity of the display panel 50 displaying images.

Of course, the user can also manually trigger the refresh driving signal generation module 30 to generate a refresh driving signal to control all pixel electrodes 140 to be short-circuited.

This application further discloses a display panel, where the gate of a second active switch 160 in the display panel 50 is used to receive the refresh driving signal generated by the refresh driving signal generation module 30. For the display panel 50, this application provides the following design.

Figure 2:
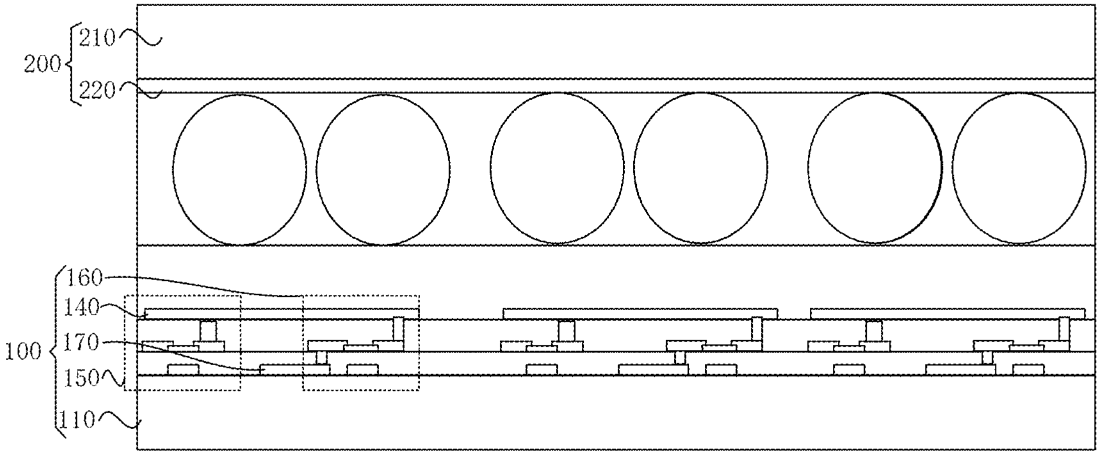
FIG. 2 is a schematic diagram of a display panel according to a first embodiment of this application.
Figure 3:
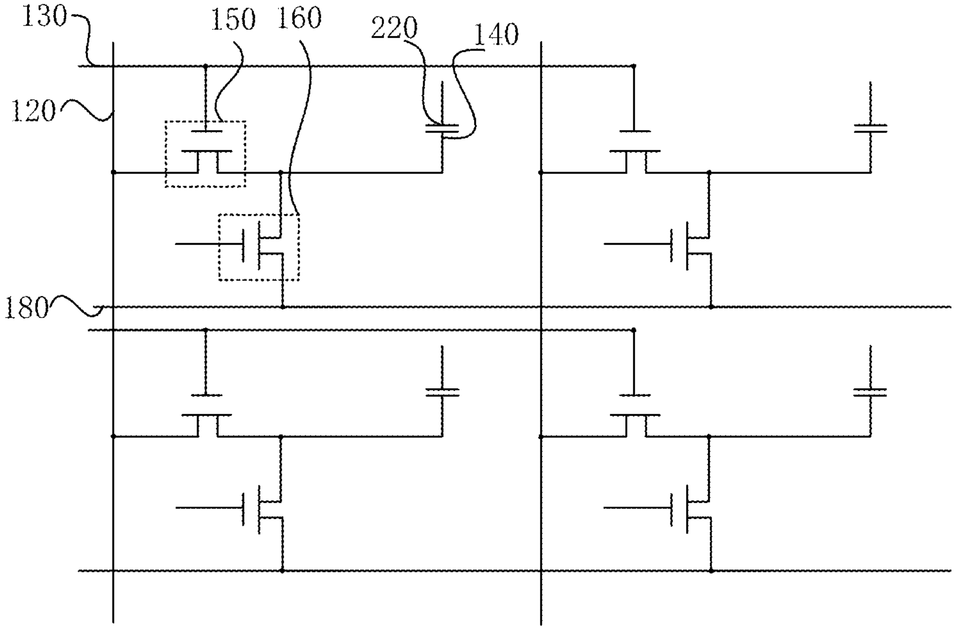
FIG. 3 is a plan view of the display panel according to the first embodiment of this application.

FIG. 2 is a schematic diagram of a display panel according to the first embodiment of this application. FIG. 3 is a planar schematic diagram of a display panel according to the first embodiment of this application. As shown in FIGS. 1-3, this application discloses a display panel 50. The display panel 50 includes an array substrate 100. The array substrate 100 includes a first base 110, and further include a data line 120, a scan line 130, a pixel electrode 140, a first active switch 150, and a second active switch 160 that are arranged on the first base 110. The data lines 120 and the scan lines 130 are arranged in a crisscross pattern to divide the display panel into a plurality of pixel units. The first active switches 150, the second active switches 160, and the pixel electrodes 140 are each arranged in one-to-one correspondence with the pixel units. The gate of the first active switch 150 is connected to the respective scan line 130. The source of the first active switch 150 is connected to the respective data line 120. The drain of the first active switch 150 is connected to the respective pixel electrode 140.

The gate of the second active switch 160 is used to receive the refresh driving signal. The source of the second active switch 160 is connected to the pixel electrode 140. The drain of each second active switch 160 is connected. The refresh driving signal may be generated in the display panel 50 or outside the display panel 50, which is not limited herein.

Compared with the related display panel 50, due to the frequent charging and discharging of the pixel electrode 140 in the display panel 50, the voltage of the pixel electrode 140 may be offset, so that the actual voltage of the pixel electrode changes, resulting in inaccurate voltage during charging. Therefore, in this application, all pixel electrodes 140 in the display panel 50 are driven to short-circuit by a refresh driving signal, and then disconnected after a first preset time, so that the pixel electrodes 140 on the entire display panel 50 can maintain the same potential, thus avoiding the voltage deviation of the pixel electrodes 140, and improving the display uniformity of the display panel 50.

Figure 4:
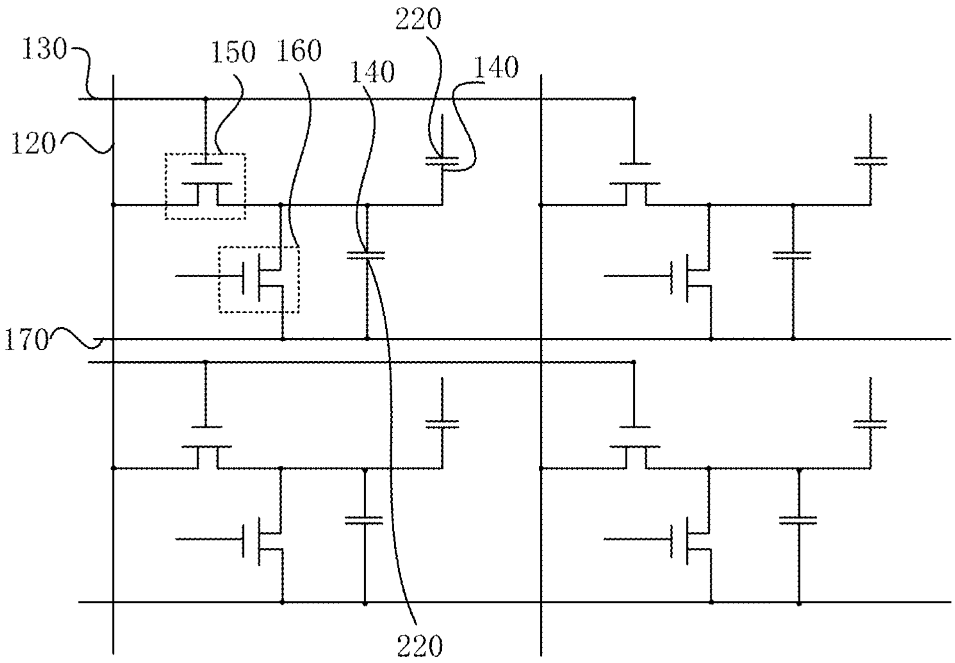
FIG. 4 is a schematic diagram of a connection between a pixel electrode a common electrode line in a display panel according to a second embodiment of this application.

FIG. 4 is a schematic diagram of a connection between a pixel electrode and a common electrode line in a display panel of a second embodiment of this application. In connection with FIG. 2 and FIG. 4, this application is explained by taking the pixel electrode 140 being connected to the common electrode line through the second active switch 160 as an example. Specifically, the display panel 50 includes an array substrate 100 and an opposing substrate 200 arranged opposite to each other. The array substrate 100 is arranged opposite to the opposing substrate 200. The opposing substrate 200 includes a second base 210 and a common electrode 220 arranged on the second base 210. The common electrode 220 is arranged opposite to the pixel electrode 140. The array substrate 100 further includes a common electrode line 170, which is arranged on the first base 110. The common electrode line 170 is connected to the common electrode 220. The drain of each and every second active switch 160 is connected together through the common electrode line 170.

Compared with the solution of adding a metal line 180 and connecting the pixel electrode 140 to the newly added metal line 180 through the second active switch 160, the solution of connecting the pixel electrode 140 to the common electrode line 170 through the second active switch 160 does not require adding a metal line 180, and uses the original common electrode line 170, which is simpler and has lower cost. Compared with the solution of connecting the pixel electrode 140 to the data line 120 or the scan line 130 through the second active switch 160, the solution of connecting the pixel electrode 140 to the common electrode line 170 through the second active switch 160 can ensure that the voltage difference between the pixel electrode 140 and the common electrode 220 is zero, thus realizing complete discharge.

Figure 5:
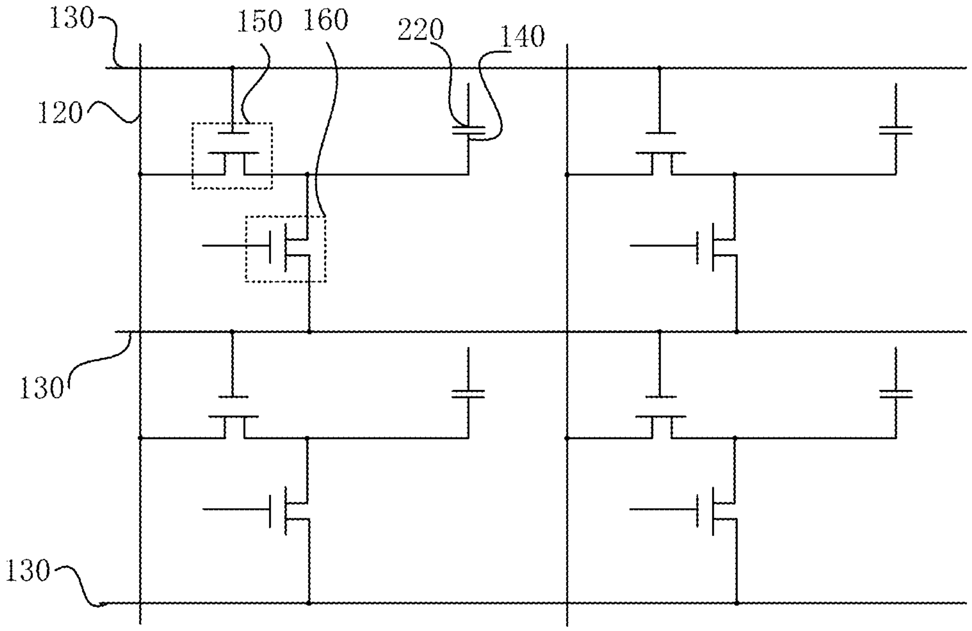
FIG. 5 is a schematic diagram of a connection between a pixel electrode and a scan line in a display panel according to a fourth embodiment of this application.

FIG. 5 is a schematic diagram of a connection between an electrode and a scan line in a display panel pixel according to a fourth embodiment of this application. As shown in FIG. 5, unlike the first embodiment, the present embodiment connects the pixel electrode 140 to the scan line 130 via the second active switch 160. Specifically, the source of the second active switch 160 is connected to the pixel electrode

140, and the drain of the second active switch 160 is connected to the scan line 130. That is, the drain of each and every second active switch 160 is connected through the scan line 130. Moreover, the second active switches 160 corresponding to the same row of scan line 130 are connected to the same scan line 130. That is, the drains of the second active switches 160 corresponding to the same row of pixel electrodes 140 are connected to the same row of scan line 130.

Compared with the solution of the first embodiment, the solution of connecting the pixel electrode 140 to the scan line 130 through the second active switch 160 does not need to add a metal line 180, but uses the original scan line 130, which is simpler and has a lower cost.

Figure 6:
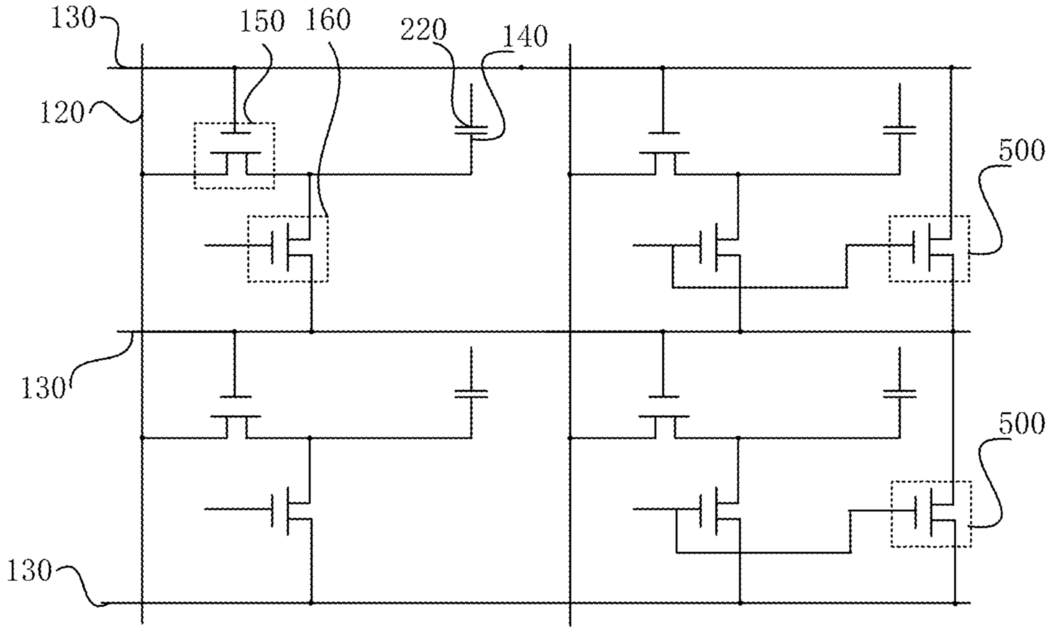
FIG. 6 is a schematic diagram of a connection between a third active switch and a scan line according to the fourth embodiment of this application.

FIG. 6 is a schematic diagram of a third active switch connected to a scan line in a fourth embodiment of this application. As shown in FIG. 6, when all the second active switches 160 in the display panel 50 are driven to be turned on by the refresh driving signal, since the drains of the second active switches 160 corresponding to the pixel electrodes 140 in the same row are connected to the scan line 130 in the same row, so that the pixel electrodes 140 in the same row can maintain the same potential, but it is difficult to ensure that the pixel electrodes 140 in different rows are at the same potential. Therefore, this application uses a plurality of third active switches 500, and the source and drain of each third active switch 500 are respectively connected to two adjacent scan lines 130. The refresh driving signal drives all the third active switches 500 to be turned on simultaneously, ensuring that all the scan lines 130 of the entire display panel 50 maintain the same potential, so that the pixel electrodes 140 on the entire display panel 50 maintain the same potential, avoiding voltage deviation of the pixel electrodes 140 and improving display uniformity of the display panel 50.

Figure 7:
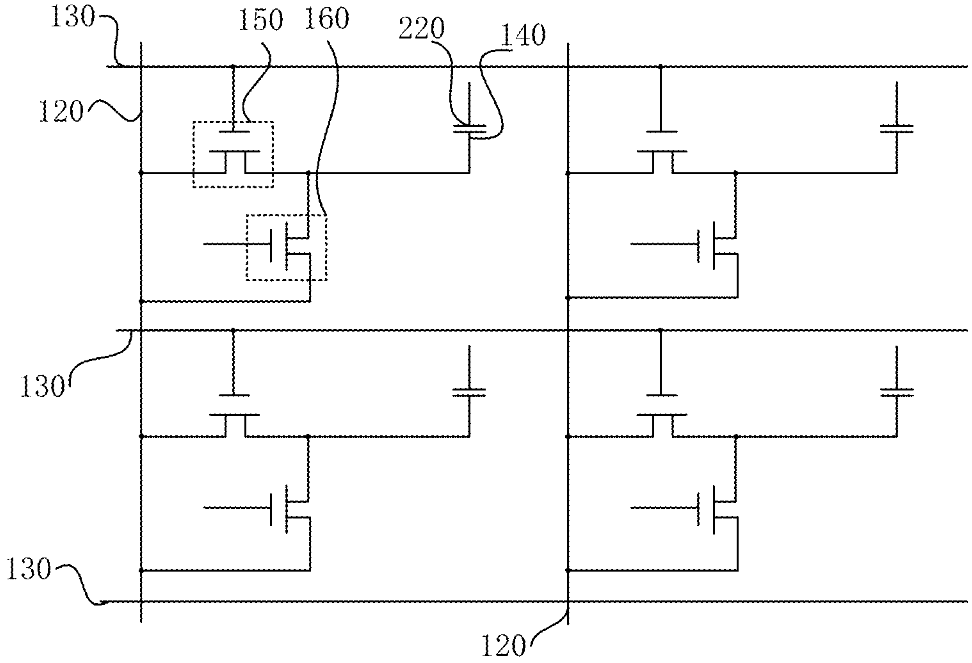
FIG. 7 is a schematic diagram of a connection between a pixel electrode and a data line in a display panel according to the third embodiment of this application

FIG. 7 is a schematic diagram of a connection between a pixel electrode and a data line of a display panel according to a third embodiment of this application. As shown in FIG. 7, unlike the first embodiment, in this embodiment, the pixel electrode 140 is connected to the data line 120 through a second active switch. Specifically, the source of the second active switch 160 is connected to the pixel electrode 140. The drain of the second active switch 160 is connected to the data line 120. Moreover, the second active switches 160 corresponding to the same column of data line 120 are connected to the same data line 120. That is, the drain of each of the second active switches 160 is connected to the same data line 120.

Compared with the solution of the first embodiment, the solution of connecting the pixel electrode 140 to the data line 120 through the second active switch 160 does not require the addition of a metal line 180, but utilizes the original data line 120, which is more convenient and has a lower cost.

Figure 8:
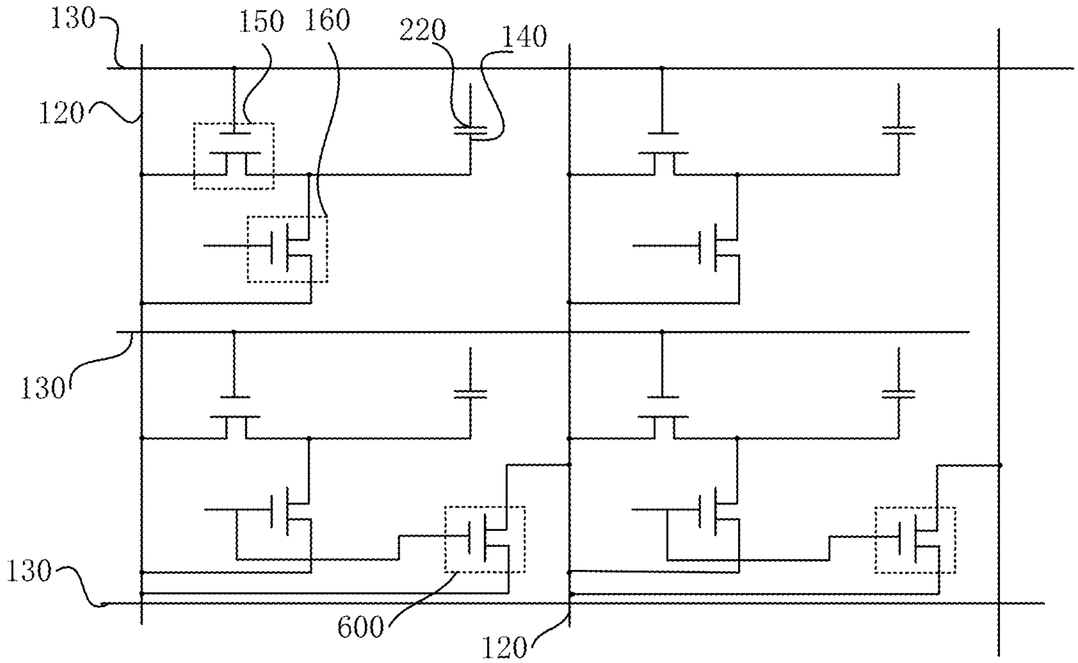
FIG. 8 is a schematic diagram of a connection between a fourth active switch and an adjacent data line according to the third embodiment of this application

FIG. 8 is a schematic diagram of a connection between a fourth active switch and adjacent data lines in the third embodiment of this application. As shown in FIG. 8, when all the second active switches 160 in the display panel 50 are driven to be turned on by the refresh driving signal, since the drains of the second active switches 160 corresponding to the pixel electrodes 140 in the same row are connected to the data line 120 in the same row, the pixel electrodes 140 in the same row can maintain the same potential, but it is difficult to ensure that the pixel electrodes 140 in different rows are at the same potential. Therefore, this application sets multiple fourth active switches 600. Each fourth active switch 600 is connected two adjacent data lines 120. That is, the source and drain of the fourth active switch 600 are respectively connected to the two adjacent data lines 120. The refresh driving signal drives all the fourth active switches 600 to be turned on at the same time.

This application further discloses a driving method of a display panel 50. The driving method of a display panel 50 may be used in the driving circuit 10 described above. For the driving method of a display panel 50, this application provides the following design.

Figure 9:
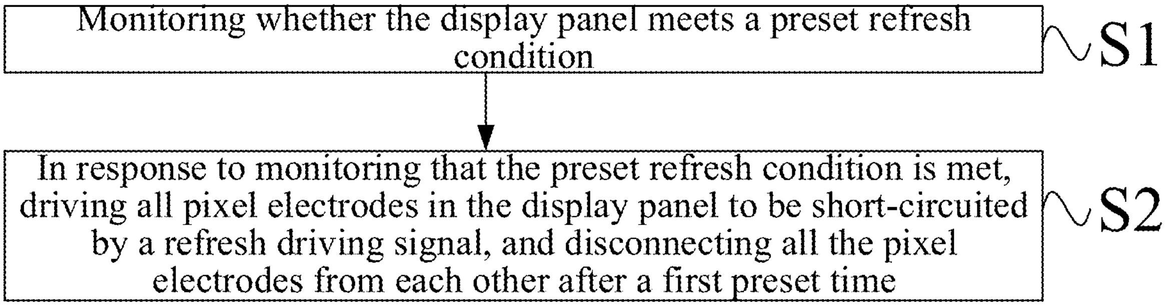
FIG. 9 is a schematic diagram of a driving method of a display panel according to an embodiment of this application.

FIG. 9 is a schematic diagram of a driving method of a display panel according to an embodiment of this application. As shown in FIG. 9, this application discloses a driving method of a display panel 50. The driving method of the display panel 50 includes the following operations:

S1: monitoring whether the display panel meets the preset refresh condition;

The preset refresh condition includes image switching, still image, and still image duration. In short, it is required to detect whether the display panel 50 is in a state of continuously refreshing different images, i.e., image switching, or in a state of keeping one image displayed, i.e., still image. In the case of still image, it is also required to monitor the duration of the still image.

S2: if the preset refresh condition is met, driving all pixel electrodes in the display panel to be short-circuited through the refresh driving signal, and then disconnecting the pixel electrodes after the first preset time.

In simple terms, short-circuiting means connecting all pixel electrodes 140 of the entire display panel 50 together so that the voltages of all pixel electrodes 140 become equal. The first preset time may be adjusted according to the refresh rate of the display panel 50, etc. The first preset time needs to be less than the duration of the blanking time interval of one frame. For example, the first preset time is set to h, the refresh rate of the current image is 60 hz, the resolution is 1080*1920, and the duration of the blanking time interval of one frame is 80 h, then (1000000/60−80 h)/1080=h, where h is approximately equal to 14.4 microseconds.

Compared with the related display panel 50, the frequent charging and discharging of the pixel electrode 140 in the display panel 50 will cause the voltage of the pixel electrode 140 to shift, thereby causing the actual voltage of 140 to change, resulting in inaccurate voltage during charging. Therefore, this application drives all the pixel electrodes 140 in the display panel 50 to short-circuit through the refresh driving signal, and disconnects them after a first preset time, so that the pixel electrodes 140 on the entire display panel 50 can maintain the same potential, thus avoiding the voltage deviation of the pixel electrodes 140, and improving the display uniformity of the display panel 50.

As shown in FIG. 2, the operation S2 in which if the preset refresh condition is met, the refresh driving signal is used to drive all pixel electrodes in the display panel to be short-circuited, and disconnecting them after a first preset time includes:

S21: if the preset refresh condition is met, driving all pixel electrodes in the display panel to be connected through the metal line by the refresh driving signal, and cutting off the connection between all pixel electrodes in the display panel after the first preset time.

That is, the method of controlling all the pixel electrodes 140 to be short-circuited includes adding a metal line 180 to the display panel 50 and adding a second active switch 160 corresponding to each pixel electrode 140. The refresh driving signal is connected to the gate of the second active switch 160 to drive the second active switch 160 to be turned on. The source of the second active switch 160 is connected to the corresponding pixel electrode 140. The drain of the second active switch 160 is connected to the metal line 180. After turning on the second active switches 160, all the pixel electrodes 140 are short-circuited together, so that the voltages of each pixel electrode 140 are all equal. In addition, a same-level voltage can be input to the metal line 180, so that each pixel electrode 140 has a same-level voltage on the basis of having the same voltage.

Of course, the metal line 180 may also be a metal line disposed in the display panel 50, such as the data line 120 or the scan line 130.

Specifically, the operation S2 in which if the preset refresh condition is met, all pixel electrodes in the display panel are driven to be connected by a refresh driving signal, and the connection between all pixel electrodes in the display panel is disconnected after a first preset time includes:

S22: if the preset refresh condition is met, all pixel electrodes in the display panel are driven to be connected to the corresponding data line or scan line by the refresh driving signal, and the connection between all pixel electrodes in the display panel and the data line or scan line is disconnected after the first preset time.

Compared with the solution of adding the metal line 180, by connecting the pixel electrodes 140 in the same row or column to the scan line 130 or the data line 120 in the corresponding row or column through the second active switches 160, when the preset refresh condition is met, the second active switches 160 are turned on, so that all the pixel electrodes 140 in the same row or column are short-circuited. At this time, all the data lines 120 or all the scan lines 130 output the same voltage, thereby maintaining the same potential. Without adding metal line 180, the design of display panel 50 is more concise, and the aperture ratio of display panel 50 is not affected.

In further combination with FIG. 3, the pixel electrode 140 may also be connected to the common electrode line 170 through the second active switch 160. Since the common electrode line 170 is just below the pixel electrode 140, the connection is even easier. Specifically, the operation of S2: if the preset refresh condition is met, driving all pixel electrodes in the display panel to be connected through the refresh driving signal, and disconnecting the connection between all pixel electrodes in the display panel after the first preset time includes:

S23: if the preset refresh condition is met, driving all pixel electrodes in the display panel to connect with the common electrode line through the refresh driving signal, and cutting off the connection between all pixel electrodes in the display panel and the common electrode line after the first preset time.

During the display process, the common electrode 220 may be affected by other signals, causing the voltage to change. If the pixel electrode 140 is given a common electrode 220 voltage, that is, the Vcom voltage, the voltage difference between the pixel electrode 140 and the common electrode 220 is not necessarily zero, which may lead to incomplete discharge. Compared to the solution of connecting all pixel electrodes 140 to the newly added metal line 180, by connecting all pixel electrodes 140 in the display panel 50 to the common electrode line 170, it can be ensured that the voltages of the pixel electrodes 140 and the common electrode 220 are equal, and the voltage difference between the pixel electrode 140 and the common electrode 220 is zero, thereby ensuring complete discharge.

When the solution of this application is used for a liquid crystal display panel 50, the display panel 50 is a liquid crystal display panel 50, and the preset refresh condition is that the current image is a static image, and the static image duration is 5-10 minutes.

For example, when the liquid crystal display panel 50 keeps a static image A for a period of time, the image A needs to be refreshed in each frame, and when each frame of the image A is refreshed, it is scanned progressively line by line, and when the scan line of the current row is turned on to charge the pixel electrodes, the pixel electrodes on the scan line of the next row will be discharged and then charged, resulting in a relatively large load on the display panel.

In this application, after the static image lasts for 5-10 minutes, all pixel electrodes of the display panel are uniformly discharged to level the potentials and then charged. Thus, it is not required to refresh the A image in each frame. When the scan line of the current row is turned on to charge the pixel electrodes, the pixel electrodes on the scan line of next row are discharged and then charged again. Keeping the time at 5-10 minutes can avoid the problem that when the static image duration is too long, the accumulated voltage offset generated by the pixel voltage during each frame refresh is too large, resulting in inaccurate display of the displayed image. It can also avoid the problem that when the time is too short, and all pixel electrodes of the display panel need to be uniformly discharged to level the potentials, so that the number of recharges increases, and the effect of reducing the load is not significant.

After the step S2: if the preset refresh condition is met, using the refresh driving signal to drive all pixel electrodes in the display panel to be short-circuited, and disconnecting after the first preset time, the method further includes:

S31: recharging the pixel electrodes to maintain the display of the current image.

That is, when the display panel 50 is a liquid crystal display panel 50, the solution of this application is applicable to the situation when the liquid crystal display panel 50 is in a static image for a long time. For example, after the detection and determination module 20 detects that the display panel 50 maintains a static image for 5-10 minutes, it will control the refresh driving signal generation module 30 to generate a refresh driving signal, thereby controlling the equipotential control module 40, i.e., the second active switch 160, so that all pixel electrodes 140 are short-circuited. At this time, the voltage difference between the pixel electrode 140 and the common electrode 220 is zero. Then the pixel electrodes 140 are recharged to maintain the display of the current image. It avoids the situation that the display panel 50 is in a static image for a long time, which causes the image to be distorted. It also has a disturbing effect on the liquid crystal, and when the image is refreshed, it can also ensure the speed of liquid crystal rotation.

When the type of display panel 50 is an electronic paper display panel 50, the solution of this application is used as follows. Specifically, the display panel 50 is an electronic paper display panel 50, and the preset refresh condition is image switching. The method further includes the following subsequent to operation S23 in which if the preset refresh condition is met, all pixel electrodes in the display panel are driven to be connected with the common electrode line by a refresh driving signal, and the connection between all pixel electrodes in the display panel and the common electrode line is disconnected after a first preset time:

S32: charging the pixel electrodes with the data driving signals of the next frame to keep the image switching.

Compared with the related electronic paper display panel 50 that needs to refresh the whole screen to be black or white when refreshing the screen, this application, when the electronic paper display panel 50 needs to display the next frame of the image, drives all pixel electrodes 140 in the display panel 50 to connect with the common electrode line 170 through the refresh driving signal, and disconnects all pixel electrodes 140 in the display panel 50 from the common electrode line 170 after a first preset time, so that the voltage between the pixel electrodes 140 and the common electrode 220 is zero. Then the pixel electrodes 140 are charged with the data driving signals of the next frame to keep the image switching. Charging after discharging can ensure that the particles in the electronic paper display panel 50 move to the ideal positions. By using the discharging method in which a driving signal is used to drive all pixel electrodes in the display panel to be connected with the common electrode line when switching to the next frame, and disconnecting the connection between all pixel electrodes in the display panel and the common electrode line after a first preset time, it is not required to refresh the entire screen to be black or white when refreshing the screen, thus avoiding the phenomenon of screen flashing of the electronic paper display panel 50 to all black or all white when refreshing the screen.

Figure 10:
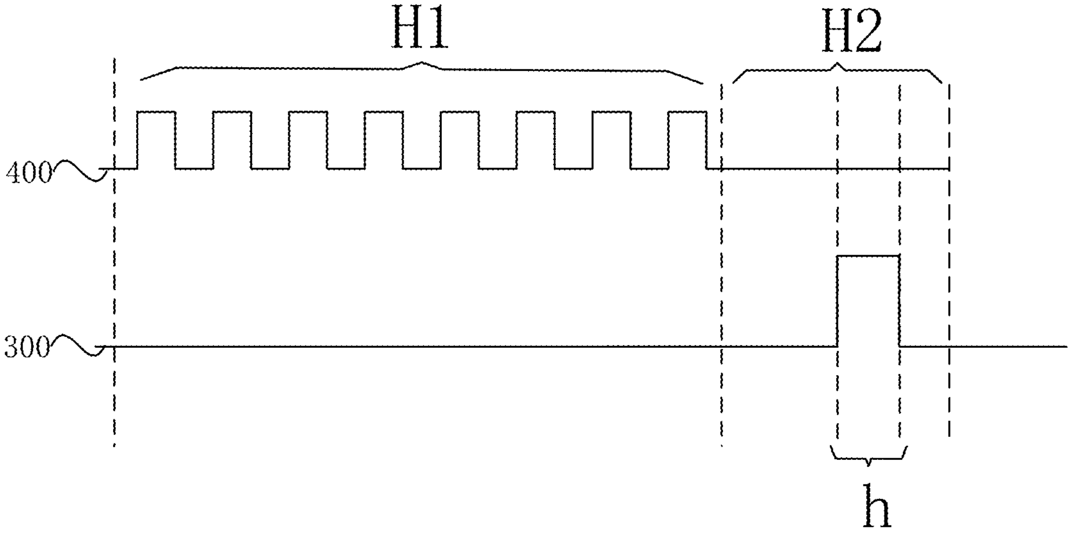
FIG. 10 is a timing diagram of a refresh driving signal according to an embodiment of this application.

FIG. 10 is a schematic diagram of a timing of a refresh driving signal according to an embodiment of this application. As illustrated in FIG. 10, there is shown a timing diagram of a gate driving signal 400 and a refresh driving signal 300 at display time H1 and blanking time H2. The operation S1: monitoring whether the display panel meets the preset refresh condition includes:

S11: after the current frame ends and before the next frame begins, monitoring whether the display panel meets the preset refresh condition;

The operation of S23: if the preset refresh condition is met, driving all pixel electrodes in the display panel to be connected with the common electrode line through the refresh driving signal, and disconnecting the connection between all pixel electrodes in the display panel and the common electrode line after a first preset time includes:

S231: if the preset refresh condition is met, after the current frame ends and before the next frame begins, driving all pixel electrodes in the display panel to be connect withed the common electrode line by the refresh driving signal, and disconnecting the connection between all pixel electrodes in the display panel and the common electrode line after the first preset time.

In simple terms, it is to monitor whether the display panel 50 meets the preset refresh condition within the blanking time H2 of the current frame, and drive all pixel electrodes 140 in the display panel 50 to be connected with the common electrode line 170 through the refresh driving signal within the blanking time H2 of the current frame, and disconnect all pixel electrodes 140 in the display panel 50 from the common electrode line 170 after the first preset time h, without affecting the normal display of the display panel 50 within the display time H1.

Of course, the technical solution of this application may also be widely used in various display panels 50, such as TN (Twisted Nematic) display panels 50, IPS (In-Plane Switching) display panels 50, VA (Vertical Alignment) display panels 50, MVA (Multi-Domain Vertical Alignment) display panels 50. Of course, other types of display panels 50, such as OLED (Organic Light-Emitting Diode) display panels 50, may all be applied to the above solution.

It should be noted that the limitations of the various steps involved in this solution are not to be interpreted to limit the order of the steps, under the premise of not affecting the implementation of the specific solution. The steps written earlier can be executed first, or later, or even at the same time with the steps written later. As long as this solution can be implemented, it should be regarded as falling in the scope of protection of this application.

It should be noted that the inventive concept of this application can be formed into many embodiments, but the length of the application document is limited and so these embodiments cannot be enumerated one by one. Therefore, should no conflict be present, the various embodiments or technical features described above can be arbitrarily combined to form new embodiments. After the various embodiments or technical features are combined, the original technical effects may be enhanced.

The foregoing is a further detailed description of this application with reference to some specific optional implementations, but it cannot be determined that the specific implementation of this application is limited to these implementations. For those having ordinary skill in the technical field to which this application pertains, several deductions or substitutions may be made without departing from the concept of this application, and all these deductions or substitutions should be regarded as falling in the scope of protection of this application.

What is claimed is:

1. A driving method of a display panel, the driving method comprising the following operations:

monitoring whether the display panel meets a preset refresh condition;

in response to monitoring that the preset refresh condition is met, driving all pixel electrodes in the display panel to be short-circuited by a refresh driving signal, and disconnecting all the pixel electrodes from each other after a first preset time;

wherein the display panel is a liquid crystal display panel; wherein the preset refresh condition comprises that a current image is a static image, and that a duration of the static image is 5-10 minutes;

wherein the method further comprises the following operation subsequent to the operation of in response to monitoring that the preset refresh condition is met, driving all the pixel electrodes in the display panel to be short-circuited by the refresh driving signal, and disconnecting all the pixel electrodes from each other after a first preset time:

recharging the pixel electrodes to maintain a display of a current image.

2. The driving method as recited in claim 1, wherein the operation of in response to monitoring that the preset refresh condition is met, driving all the pixel electrodes in the display panel to be short-circuited by the refresh driving signal, and disconnecting all the pixel electrodes from each other after a first preset time comprises:

in response to monitoring that the preset refresh condition is met, driving all the pixel electrodes in the display panel to be connected to each other through a metal line by the refresh driving signal, and disconnecting all the pixel electrodes in the display panel from each other after the first preset time.

3. The driving method as recited in claim 2, wherein the operation of in response to monitoring that the preset refresh condition is met, driving all the pixel electrodes in the display panel to be connected to each other through the metal line by the refresh driving signal, and disconnecting all the pixel electrodes in the display panel from each other after the first preset time comprises:

in response to monitoring that the preset refresh condition is met, driving all the pixel electrodes in the display panel to be connected to a common electrode line by the refresh driving signal, and disconnecting all the pixel electrodes in the display panel from the common electrode line after the first preset time.

4. The driving method as recited in claim 2, wherein the operation of in response to monitoring that the preset refresh condition is met, driving all the pixel electrodes in the display panel to be short-circuited by the refresh driving signal, and disconnecting all the pixel electrodes from each other after the first preset time comprises:

in response to monitoring that the preset refresh condition is met, driving all the pixel electrodes in the display panel to be connected to respective data lines by the refresh driving signal, and disconnecting all the pixel electrodes in the display panel from the respective data lines after the first preset time.

5. The driving method as recited in claim 2, wherein the operation of in response to monitoring that the preset refresh condition is met, driving all the pixel electrodes in the display panel to be short-circuited by the refresh driving signal, and disconnecting all the pixel electrodes from each other after a first preset time comprises:

in response to monitoring that the preset refresh condition is met, driving all the pixel electrodes in the display panel to be connected to respective scan lines by the refresh driving signal, and disconnecting all the pixel electrodes in the display panel from the respective scan lines after the first preset time.

6. The driving method as recited in claim 3, wherein the display panel is an electronic paper display panel, and wherein the preset refresh condition comprises image switching;

wherein the method further comprises the following operation subsequent to the operation of in response to monitoring that the preset refresh condition is met, driving all the pixel electrodes in the display panel to be connected to the common electrode line by the refresh driving signal, and disconnecting all the pixel electrodes in the display panel from the common electrode line after the first preset time:

charging the pixel electrodes with data driving signals of a next frame to keep the image switching.

7. The driving method as recited in claim 6, wherein the operation of monitoring whether the display panel meets the preset refresh condition comprises:

subsequent to a current frame ends and prior to a next frame begins, monitoring whether the display panel meets the preset refresh condition;

wherein the operation of in response to monitoring that the preset refresh condition is met, driving all the pixel electrodes in the display panel to be connected with the common electrode line through the refresh driving signal, and disconnecting all the pixel electrodes in the display panel from the common electrode line after the first preset time comprises:

in response to monitoring that the preset refresh condition is met, subsequent to the current frame ends and prior to the next frame begins, driving all the pixel electrodes in the display panel to be connected with the common electrode line through the refresh driving signal, and disconnecting all the pixel electrodes in the display panel from the common electrode line after the first preset time.

8. The display panel as recited in claim 1, wherein the refresh driving signal is generated inside the display panel.

9. The display panel as recited in claim 1, wherein the refresh driving signal is generated externally to the display panel.

10. A display panel, comprising an array substrate, wherein the array substrate comprises a first base, and a plurality of data lines, a plurality of scan lines, a plurality of pixel electrodes, a plurality of first active switches, and a plurality of second active switches that are arranged on the first base;

wherein the plurality of data lines and the plurality of scan lines are arranged in a crisscross pattern to divide the display panel into a plurality of pixel units; wherein the plurality of first active switches, the plurality of second active switches, and the plurality of pixel electrodes are each arranged in one-to-one correspondence with the plurality of pixel units; wherein a gate of each of the plurality of first active switches is connected to the respective scan line, wherein a source of each of the plurality of first active switches is connected to the respective data line, wherein a drain of each of the plurality of first active switches is connected to the respective pixel electrode;

wherein a gate of each of the plurality of second active switches is configured to receive a refresh driving signal, a source of each of the plurality of second active switches is connected to the respective pixel electrode, and wherein respective drains of the plurality of second active switches are connected to each other;

wherein the display panel comprises an array substrate and an opposing substrate that are arranged opposite to each other, wherein the array substrate is arranged opposite to the opposing substrate, wherein the opposing substrate comprises a second base and a common electrode arranged on the second base, wherein the common electrode is arranged opposite to the pixel electrode;

wherein the array substrate further comprises a common electrode line arranged on the first base, wherein the common electrode line is connected to the common electrode; wherein the respective drains of the plurality of second active switches are connected to each other through the common electrode line.

11. A display panel, comprising an array substrate, wherein the array substrate comprises a first base, and a plurality of data lines, a plurality of scan lines, a plurality of pixel electrodes, a plurality of first active switches, and a plurality of second active switches that are arranged on the first base;

wherein the plurality of data lines and the plurality of scan lines are arranged in a crisscross pattern to divide the display panel into a plurality of pixel units; wherein the plurality of first active switches, the plurality of second active switches, and the plurality of pixel electrodes are each arranged in one-to-one correspondence with the plurality of pixel units; wherein a gate of each of the plurality of first active switches is connected to the respective scan line, wherein a source of each of the plurality of first active switches is connected to the respective data line, wherein a drain of each of the plurality of first active switches is connected to the respective pixel electrode;

wherein a gate of each of the plurality of second active switches is configured to receive a refresh driving signal, a source of each of the plurality of second active switches is connected to the respective pixel electrode, and wherein respective drains of the plurality of second active switches are connected to each other;

wherein the array substrate further comprises a plurality of third active switches, wherein a source and drain of each of the plurality of third active switches are respectively connected to two adjacent scan lines, and wherein the refresh driving signal is operative to drive all the plurality of third active switches to be turned on simultaneously.

12. The display panel as recited in claim 11, wherein the source of each of the plurality of second active switches is connected to the respective pixel electrode, the drain of each of the plurality of second active switches is connected to the respective scan line, and wherein the drains of the second active switches corresponding to each same row of pixel electrodes are connected to the respective scan line of a same row.

* * * * *